US012612879B2

(12) United States Patent
Hochfilzer et al.

(10) Patent No.: US 12,612,879 B2
(45) Date of Patent: Apr. 28, 2026

(54) METHOD FOR OPERATING AN INTERNAL COMBUSTION ENGINE

(71) Applicant: INNIO Jenbacher GmbH & Co OG, Jenbach (AT)

(72) Inventors: Bernadet Hochfilzer, Innsbruck (AT); Georg Arnold, Innsbruck (AT); Alexander Zuschnig, Baumkirchen (AT)

(73) Assignee: Innio Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 18/868,697

(22) PCT Filed: May 24, 2022

(86) PCT No.: PCT/AT2022/060178
§ 371 (c)(1),
(2) Date: Nov. 22, 2024

(87) PCT Pub. No.: WO2023/225693
PCT Pub. Date: Nov. 30, 2023

(65) Prior Publication Data
US 2026/0036096 A1 Feb. 5, 2026

(51) Int. Cl.
*F02D 19/08* (2006.01)
*F02D 19/06* (2006.01)
(Continued)

(52) U.S. Cl.
CPC ....... *F02D 19/088* (2013.01); *F02D 19/0644* (2013.01); *F02D 19/0647* (2013.01);
(Continued)

(58) Field of Classification Search
CPC ............... F02D 19/088; F02D 19/0644; F02D 19/0647; F02D 35/023; F02D 35/028
See application file for complete search history.

(56) References Cited

U.S. PATENT DOCUMENTS 6,612,269 B2 9/2003 Heffel et al.
10,077,729 B2 9/2018 Huber et al.
(Continued)

FOREIGN PATENT DOCUMENTS

| | | | |
|---|---|---|---|
| DE | 909521 | C | 4/1954 |
| DE | 102016225031 | A1 | 1/2018 |
| EP | 2977596 | A1 | 1/2016 |

OTHER PUBLICATIONS

PCT International Search Report and Written Opinion; Application No. PCT/AT2022/060178; dated Feb. 2, 2023; 16 pages.
(Continued)

*Primary Examiner* — Syed O Hasan
(74) *Attorney, Agent, or Firm* — Fletcher Yoder, P.C.

(57) ABSTRACT

Method for operating an internal combustion engine, wherein the internal combustion engine is operated by an air-fuel mixture comprising a fuel mixture and air, wherein the fuel mixture comprises a first fuel, preferably natural gas, and hydrogen as a second fuel different from the first fuel, wherein a hydrogen content of the fuel mixture is determined, and at least an ignition timing is adapted as a function of the hydrogen content of the fuel mixture independent of a target power output of the internal combustion engine, wherein the higher the amount of hydrogen in the fuel mixture the later the ignition timing is set for at least partially compensating a shift of a center of combustion due to higher flame speed of hydrogen compared to the first fuel.

19 Claims, 3 Drawing Sheets

(51) Int. Cl.

| | |
|---|---|
| ***F02D 35/02*** | (2006.01) |
| ***F02D 41/00*** | (2006.01) |
| ***F02P 5/152*** | (2006.01) |

(52) U.S. Cl.
CPC ....... *F02D 35/023* (2013.01); *F02D 41/0007* (2013.01); *F02P 5/1527* (2013.01); *F02P 5/1528* (2013.01); *F02D 2200/0612* (2013.01); *F02D 2250/36* (2013.01)

(56) References Cited

U.S. PATENT DOCUMENTS

| | | | | |
|---|---|---|---|---|
| 2002/0029770 | A1 | 3/2002 | Heffel et al. | |
| 2005/0188683 | A1* | 9/2005 | Miyoshi ................ | F02D 19/081 60/285 |
| 2007/0181083 | A1* | 8/2007 | Fulton ................ | G06Q 30/0225 123/3 |
| 2008/0202449 | A1* | 8/2008 | Shimada ................. | F02B 43/04 123/3 |

OTHER PUBLICATIONS

Baratta, Mirko et al; "Performance and Emissions of a Turbo-charged Spark Ignition Engine Fuelled with CNG and CNG/Hydrogen Blends", SAE 2010 Commercial Vehicle Engineering Congress SAE Technical Papers, Apr. 8, 2013, XP093014808, ISSN: 0148-7191, DOI: 10.4271/2013-01-0866, Retrieved from the Internet: https://saemobilus.sae.org/content/201 3-01-0866/, pp. 2-17.

Munshi, S. R. et al; "Hydrogen Blended Natural Gas Operation of a Heavy Duty Turbocharged Lean Burn Spark Ignition Engine South Coast Air Quality Management District Downloaded from SAE International by European Patent Office", SAE 2010 Commercial Vehicle Engineering Congress Sae Technical Papers, Oct. 25, 2004 (Oct. 25, 2004), pp. 1-17, XP093014877, ISSN:• 0148-7191, DOI: 10.4271/2004-01-2956 Retrieved from the Internet: https://saemobilus.sae.org/content/200 4-01-2956, pp. 5-8.

* cited by examiner

METHOD FOR OPERATING AN INTERNAL COMBUSTION ENGINE

CROSS-REFERENCE TO RELATED APPLICATION

This application is a National Stage entry from, and claims benefit of, PCT Application No. PCT/AT2022/060178, filed on May 24, 2022, entitled "METHOD FOR OPERATING AN INTERNAL COMBUSTION ENGINE", which is herein incorporated by reference in its entirety.

BACKGROUND

The present invention concerns a method for operating an internal combustion engine operated by a hydrogen containing fuel mixture and an internal combustion engine comprising a control unit.

Internal combustion engines, more specifically reciprocating internal combustion engines, as described herein are capable to burn individual fuel gases as well as mixtures of individual fuel gases as an air-fuel mixture.

It is commonly known by the state of the art to operate such internal combustion engines by fuel gases such as natural gas, wherein the natural gas is for example delivered to the internal combustion engine by a public gas supply grid.

As the market offer of hydrogen increases continuously and the price of hydrogen decreases, it is expected in the future, that fuel sources such as natural gas from a public supply grid can be augmented by an amount of hydrogen, such that in the future sources such as natural gas grids can deliver fuel mixtures containing hydrogen of a certain amount.

Specifications for such measures are for example given by norms, i.e., ÖNORM EN 16726.

In this regard, internal combustion engines supplied by such fuel sources have to be prepared for changing properties of fuels and fuel mixtures, wherein preferably the operating conditions of the internal combustion engine has to be adopted for an expected share of hydrogen in the delivered fuel mixture.

Such internal combustion engines and methods for operating internal combustion engines by fuel mixtures comprising hydrogen are known for example by DE 10 2016 225 031 A1 or US 2002/0029770 A1, wherein methods are disclosed to define a specific amount of hydrogen in a fuel-mixture and how to adjust the internal combustion engine to optimize the combustion process considering this defined specific hydrogen amount.

But it is still a disadvantage that internal combustion engines are not designed to be operated by a second fuel differing from the first, as, e.g., hydrogen differs from natural gas by its properties significantly.

Therefore, e.g., turbochargers of internal combustion engines operated by natural gas are designed by specific parameters given by the combustion process of natural gas, wherein temperature, volume flow and/or enthalpy of the exhaust gas are major aspects for the design, construction and/or dimensioning of a turbocharger to optimize the efficiency of the internal combustion engine.

Such specific parameters are strongly influenced by the type of fuel used in the combustion process, wherein already small differences of the mixing ratio of fuel mixtures or small amounts of differing fuels in a main fuel result in differences of the combustion parameters.

Therefore, a big disadvantage of the state of the art is that specific parts of the internal combustion engine (e.g., turbochargers, compressors, exhaust treatment systems, and so on) are not designed, constructed and/or dimensioned to perform efficient work by varying fuels and/or fuel compositions.

BRIEF DESCRIPTION

An aspect of the invention is to provide a method for operating an internal combustion engine and an internal combustion engine, wherein the components of the internal combustion engine and/or the whole system of the internal combustion engine can be operated more efficient and/or more flexible to changing fuels or fuel compositions.

This aspect is achieved by a method for operating an internal combustion engine and an internal combustion engine with the features described in detail below.

According to certain aspects of the invention, it is provided that the internal combustion engine is operated by an air-fuel mixture comprising a fuel mixture and, preferably charged, air, wherein the fuel mixture comprises a first fuel, preferably natural gas, and hydrogen as a second fuel different from the first fuel, wherein a hydrogen content of the fuel mixture is determined, and at least an ignition timing is adapted as a function of the hydrogen content of the fuel mixture independent of a target power output of the internal combustion engine, wherein the higher the amount of hydrogen in the fuel mixture the later the ignition timing is set for at least partially compensating a shift of a center of combustion due to higher flame speed of hydrogen compared to the first fuel.

An increased amount of hydrogen in the fuel mixture of the internal combustion engine leads to a faster combustion. This effect is based on the different combustion properties of the different fuel admixed to the fuel mixture combusted in the internal combustion engine. As hydrogen has a very high laminar flame speed (compared to natural gas), the total combustion of the fuel mixture is faster if a higher content of hydrogen is present.

As the enthalpy and/or the exhaust temperature of an exhaust gas produced by the combustion process decreases if the same process is performed with a fuel mixture having a higher content of hydrogen, components of the internal combustion engine which are arranged in the path of the exhaust gas and which are powered by the exhaust gas do not receive the same energy anymore, wherein, e.g., the turbine of a turbocharger cannot deliver as much energy to the compressor or an exhaust treatment system (mostly requiring a certain temperature-such as treatment systems comprising catalysts) cannot efficiently be operated.

By an embodiment of the invention, it is preferably provided that a hydrogen content of the fuel mixture provided to be combusted in the internal combustion engine is monitored and that the ignition timing is varied referring to a change of the hydrogen content.

In contrast to the state of the art, the ignition timing is not varied directly referring to a changing hydrogen content to reach the best combustion efficiency, but instead the ignition timing is set in each case afterwards if the hydrogen content (the amount of hydrogen in the fuel mixture) increases to at least partially compensate a shift of the center of combustion due to higher flame speed of hydrogen compared to the first fuel.

Preferably, the shift of the center of combustion is compensated essentially completely according to aspects of the invention, such that, e.g., turbines and/or exhaust gas treatment systems can function as intended.

An internal combustion engine according to aspects of the invention is therefore capable of being operated as intended even if fuel mixtures are used which substantially alter the properties of the combustion.

The shift of the ignition timing results in increasing exhaust temperatures, wherein the enthalpy of the exhaust gas can be increased.

It should be mentioned that all statements regarding air fuel mixtures with "higher" or "lower" contents of hydrogen or other fuels are compared to each other assuming that the content is determined under same ambient conditions (temperature, pressure, etc.).

A fuel gas has to be understood, in particular, as a fuel which is gaseous under normal conditions, that is to say in particular at 25° C. and 1013 mbar.

In particular, the fuel mixture can contain methane as the first fuel substance and hydrogen as the second fuel substance. The first fuel could for example be a burnable gas, such as gases containing methane and/or other hydrocarbons. The combustible first fuel can in particular be natural gas, liquefied natural gas (LNG), compressed natural gas (CNG) or another suitable combustible gas.

It is possible that the fuel mixture contains other combustible and/or non-combustible substances.

The main advantage of certain aspects of the present invention is therefore that an internal combustion engine can be provided which can be operated with only a first fuel and a combination of a first fuel and hydrogen at any mixture ratio between the first fuel and hydrogen, wherein components of the internal combustion engine can be operated effectively although they are not designed, calculated and/or constructed for the operation with a fuel mixture containing a first fuel and hydrogen.

The center of combustion can be measured for example by mass fraction burnt (MFB), such as the MFB50 (the time in the combustion in which 50% of the mass of the fuel is burnt; Source: Internal Combustion Engine Fundamentals, John B. Heywood).

To characterize the combustion process, the profile of the burned mass fraction as a function of the crank angle may be used. The rate at which fuel-air mixture burns generally increases from a low value immediately following the spark discharge to a maximum about halfway through the burning process and then generally decreases to close to zero as the combustion process ends. It may prove convenient to use these mass fraction burned fraction curves to characterize different stages of the spark-ignition engine combustion process by their duration in crank angles.

Parameters describing the center of combustion can for example be calculated from a pressure progression in the cylinder during combustion, measured by external sensors (e.g., a knock sensor) and/or internal sensors (in-cylinder pressure sensor).

Already present internal combustion engines can be upgraded and operated by a method according to certain aspects of the invention. Therefore, certain aspects of the invention can be used for the embodiments of the prior art already in the introduction of the description described.

The disclosed aspects of the invention can particularly preferably be used in conjunction with internal combustion engine driving a generator for creating electrical energy. Such combinations of internal combustion engines driving a generator are known as gensets.

Advantageous embodiments are defined in the dependent claims.

In the gas mixture of first fuel, preferably natural gas, and hydrogen, for example, the fuel flow rate has to be increased as the ratio of hydrogen to first fuel is increased due to the lower energy density of hydrogen, as the internal combustion engine should be operated with the same power output.

It can be provided that the higher the amount of hydrogen in the fuel mixture the higher a boost pressure target value is set to meet a target NOx amount in the exhaust gas of the internal combustion engine.

It can be provided that a lambda value of the combustible air-fuel mixture supplied to the internal combustion engine is adapted during a change of the amount of hydrogen in the fuel mixture, preferably for at least partially-particular preferred completely-compensating the increase of the boost pressure without adapting an actual power output of the internal combustion engine.

It can be provided that a lambda value of the combustible air-fuel mixture supplied to the internal combustion engine is increased during an increase of the amount of hydrogen in the fuel mixture beyond an increase of a lambda value when using only the first fuel.

In other words, given a maximum lambda value for combustion with only the first fuel, it can be provided that the lambda value can be increased above the maximum lambda for the first fuel when the fuel mixture comprising the first fuel and the second fuel is combusted.

The mass flow of fuel mixture decreases because of increasing hydrogen content of the fuel mixture if the power output of the internal combustion engine should be constant, as the fuel density of hydrogen compared to the first fuel, preferably natural gas, is lower. Therefore, the enthalpy of the exhaust gas decreases as the mass flow decreases compared to a combustion with a lower content of hydrogen and the same power output of the internal combustion engine.

By an increase of the lambda value of the combustible air-fuel mixture supplied to the internal combustion engine during an increase of the amount of hydrogen in the fuel mixture beyond an increase of a lambda value when using only the first fuel, the effect of a sinking enthalpy of the exhaust gas can be countered additionally, as the mass flow of the exhaust gas can be increased or kept constant by the increased lambda value. Furthermore, emissions, such as, e.g., NOx, can be decreased by the increasing lambda value.

It can be provided that depending on the amount of hydrogen in the fuel mixture, a target NOx amount in the exhaust gas of the internal combustion engine is held constant or is adapted, preferably decreased.

It can be provided that the target NOx amount in the exhaust gas of the internal combustion engine is set below a target NOx amount compared to a target NOx amount when using only the first fuel.

It can be provided that the amount of fuel mixture is adapted to compensate the difference in a heating value of hydrogen compared to the first fuel, preferably natural gas, wherein in particular preferred embodiments a target power output of the internal combustion engine is controlled with a power controller, wherein the power controller is capable of adapting the amount of fuel mixture.

It can be provided that the boost pressure target value is adapted depending on the amount of hydrogen in the fuel mixture. Particularly preferably, it can be provided that the higher the hydrogen amount in the fuel mixture the higher the boost pressure target value is set.

In consequence thereof, an increase of the lambda value of the combustible air-fuel mixture supplied to the internal combustion engine leads to a decrease of the NOx amount in the exhaust gas in order to fulfill the hydrogen amount dependent target NOx amount in the exhaust gas of the internal combustion engine.

It can be provided that a boost pressure is adapted in a feedback control as a function of a continuously measured NOx content of the exhaust gas of the internal combustion engine.

It can be provided that a boost pressure or a boost pressure offset is adapted as a function of the amount of hydrogen in the fuel mixture.

It can be provided that the boost pressure or the boost pressure offset is adapted as a linear function of the amount of hydrogen in the fuel mixture.

It can be provided that a target NOx amount in the exhaust gas of the internal combustion engine is adapted as a function of the amount of hydrogen in the gas mixture.

It can be provided that the target NOx amount in the exhaust gas of the internal combustion engine is adapted as a linear function of the amount of hydrogen in the fuel mixture. It is also conceivable that the function is only partially linear having differing gradients.

It can be provided that the hydrogen content of the fuel mixture is determined, preferably continuously, by means of a hydrogen sensor.

It can be provided that the hydrogen content of the fuel mixture is determined continuously or periodically during operation of the internal combustion engine, preferably in real time, so that current information about the hydrogen content is obtained preferably at any time or at least at relevant time intervals.

It can be provided that the hydrogen content of the fuel mixture is estimated, preferably continuously, by means of an in-cylinder pressure sensor.

The content of hydrogen in the gas mixture or the air-fuel mixture can be determined in a number of ways by analyzing one or more differentiable characteristics of the gas mixture supplied prior to combustion, by analyzing the combustion or the combustion results, wherein the hydrogen content can be detected directly (e.g., by a hydrogen sensor) or indirectly by monitoring combustion characteristics (such as, e.g., temperature, power output, exhaust gas content).

It can be provided that the fuel mixture supplied to the internal combustion engine comprises an amount of hydrogen in a range between 0 and 30 Vol. %, preferably between 0 and 25 Vol. %.

It can be provided that the fuel mixture supplied to the internal combustion engine comprises an amount of hydrogen of more than 30 Vol. %, e.g., up to 60 Vol. %. In principle, with certain aspects of the invention described herein, it is possible to operate an internal combustion engine with any Vol. % of hydrogen admixed to a fuel different from hydrogen.

Furthermore, protection is sought for an internal combustion engine operated according to an embodiment of the invention.

The internal combustion engine can preferably be capable of operation with 100% hydrogen as well as operation with the fuel mixture of the first fuel and hydrogen.

In particularly preferred embodiments, the ignition timing under operation with 100% hydrogen is set for at least partially compensating a shift of a center of combustion due to higher flame speed of hydrogen compared to the operation with the mixture of the first fuel and hydrogen.

BRIEF DESCRIPTION OF THE DRAWINGS

Further details and advantages of the invention are apparent from the accompanying figures and the following description of the drawings. The figures show.

DETAILED DESCRIPTION

Figure 1:
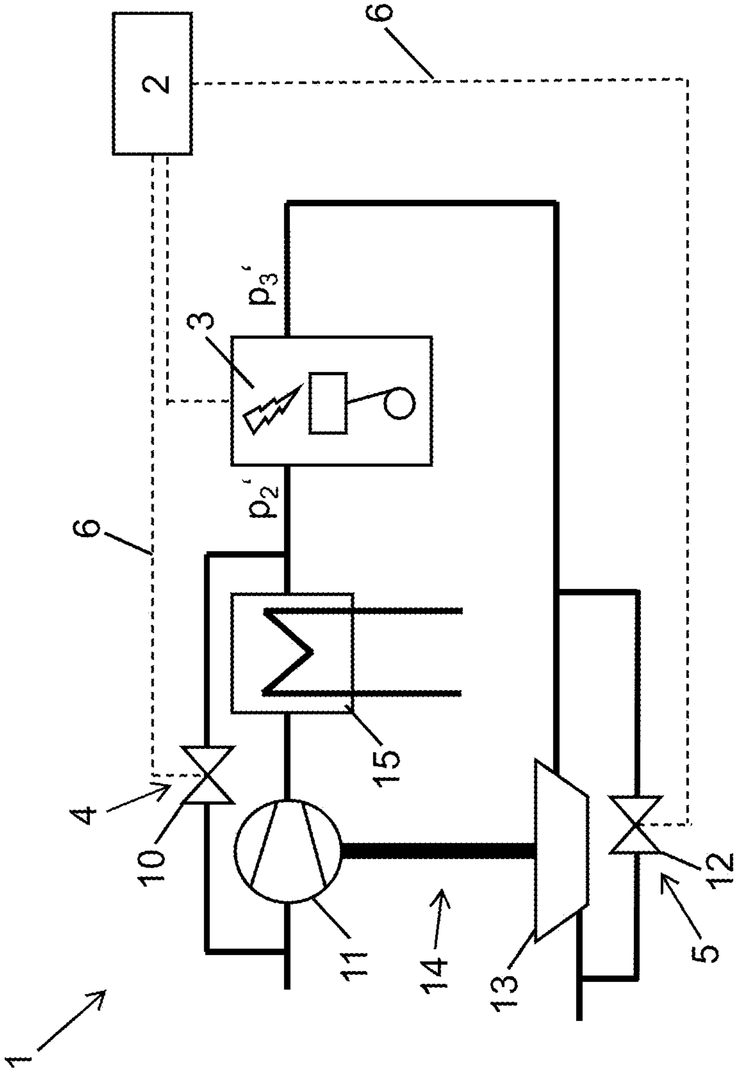
FIG. 1 is a schematic of an internal combustion engine.

FIG. 1 illustrates a first embodiment of an internal combustion engine 1. This internal combustion engine has a combustion chamber 3 in which a fuel-air mixture is combusted.

This invention is, of course, not restricted to a single combustion chamber 3 and the combustion chamber 3 used in the Figures serves only as an example. The invention can be used on an internal combustion engine 1 for one or more combustion chambers 3 selectively and/or globally for all applications.

The fuel-air mixture is supplied to at least one combustion chamber through a compressor 11 of a turbocharger 14, wherein the fuel-air mixture can be cooled after compression by the compressor 11 in a mixture cooler 15.

The air-fuel mixture supplied can be mixed by a gas mixer (not illustrated in FIG. 1) upstream of the compressor 11, wherein a fuel or a fuel mixture—e.g., provided by a natural gas supply grid—can be mixed with air and passed to the compressor 11.

The mixture cooler 17 and the compressor 11 can be bypassed by means of a bypass line with a compressor bypass valve 10, wherein a boost pressure $p_2'$ can be adjusted by this compressor bypass valve 10 and with that boost pressure $p_2'$ least one combustion chamber 3 can be filled.

By changing the boost pressure $p_2'$, it is possible to vary the filling of at least one combustion chamber 3.

In addition, the turbocharger 14 has an exhaust turbine 13 that can be bypassed by a bypass line along with the turbine bypass valve 12.

By means of this turbine bypass valve 12, an exhaust backpressure $p_3'$ can be set which acts on the at least one combustion chamber 3.

A control unit 2 (e.g., controller) is provided which is signal conductively connected by means of signal conducting connections 6, on the one hand to the compressor bypass valve 10 of the compressor 11 and on the other hand to the turbine bypass valve 12 of the exhaust turbine 13.

Furthermore, the control unit 2 is signal conductively connected with the combustion chamber 3 to control or monitor the combustion process. Via this signal connection 6, it would also be possible for the control unit 2, e.g., to vary or control an ignition timing of the combustion by an ignition source, preferably a spark plug.

The compressor bypass valve 10 of the compressor 11 (and also of the mixture cooler 15) in this embodiment is configured as an actuator 4 that influences combustion parameters.

The turbine bypass valve 12 of the exhaust turbine 13 in this embodiment forms the actuator 5 that influences the exhaust backpressure $p_3'$.

The control unit 2 is configured to actuate the at least one actuator 4 (in this embodiment the compressor bypass valve 10 of the compressor 11) that influences the boost pressure $p_2'$.

As already described in the beginning, fuel sources such as natural gas from a public supply grid can contain a certain amount of hydrogen, and a method for operating the internal combustion engine is provided to react on varying contents of hydrogen in the air-fuel mixture according to certain aspects of the invention.

Figure 2:
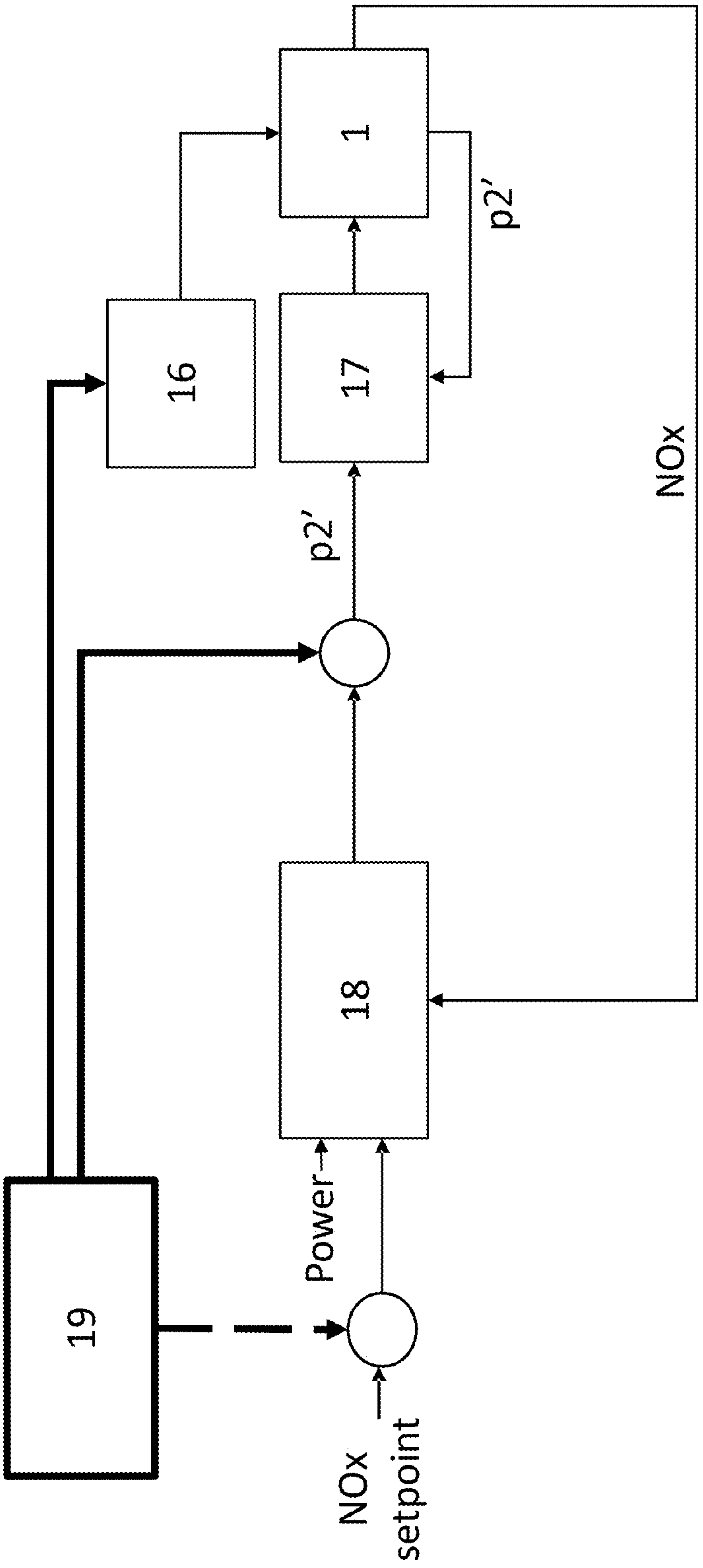
FIG. 2 is a schematic of an internal combustion engine operated by a method according to certain aspects of the invention.

An embodiment of such a method for operating an internal combustion engine 1 is shown by FIG. 2.

FIG. 2 illustrates a schematic overview of a method for operating an internal combustion engine 1.

In this embodiment, the control unit 2 is split up into an ignition timing control module 16 and a boost pressure control module 17, wherein an ignition timing of the combustion in the combustion chamber 3 and a boost pressure of the air-fuel-mixture delivered to the combustion chamber 3 can be controlled by the control unit 2.

The boost pressure setpoint $p_2'$ is provided by a calculation unit 18 to the boost pressure control module 17, wherein the calculation unit 18 calculates a boost pressure setpoint based on a given NOx setpoint and a power requirement of the internal combustion engine 1.

The calculation unit 18 could for example be embodied as the regulating device disclosed in EP 2 977 596 B1.

The ignition timing setpoint is given by the hydrogen control unit 19.

The hydrogen control unit 19 is configured to:

determine a hydrogen content of the fuel mixture, adapt an ignition timing as a function of the hydrogen content of the fuel mixture independent of a target power output of the internal combustion engine 1, wherein the higher the amount of hydrogen in the fuel mixture the later the ignition timing is set to compensate a shift of center of combustion due to higher flame speed of hydrogen compared to the first fuel.

"Independent of a target power output" in this context is to be understood that the ignition timing is not adapted in order to change a target power output of the internal combustion engine, e.g., in the case of a change in load, but is adapted depending on the hydrogen amount in the fuel mixture. Of course, it can be necessary to adapt the ignition timing in reaction of a change in load, but such a reaction is different to the adaption of the ignition timing depending on the hydrogen amount in the fuel mixture to compensate for a change of combustion speed of the fuel mixture.

Furthermore, it can be provided that the hydrogen control unit 19 is configured to influence the target NOx amount, wherein the higher the amount of hydrogen in the fuel mixture the higher a boost pressure target value is set to meet a target NOx amount in the exhaust gas of the internal combustion engine 1, wherein indirectly via the calculation unit 18 the boost pressure setpoint $p_2'$ is controlled to meet the requirements of the NOx setpoint.

It can also be provided that the hydrogen control unit 19 is configured to directly vary the boost pressure setpoint $p_2'$ to influence the lambda value.

The ignition timing control module 16, boost pressure control module 17, calculation unit 18 and/or hydrogen control unit 19 can be embodied as separate hardware components and/or software modules. In other preferred embodiments, these modules are partially or fully integrated with each other as one or more software modules being executed on one or more hardware components.

Figure 3:
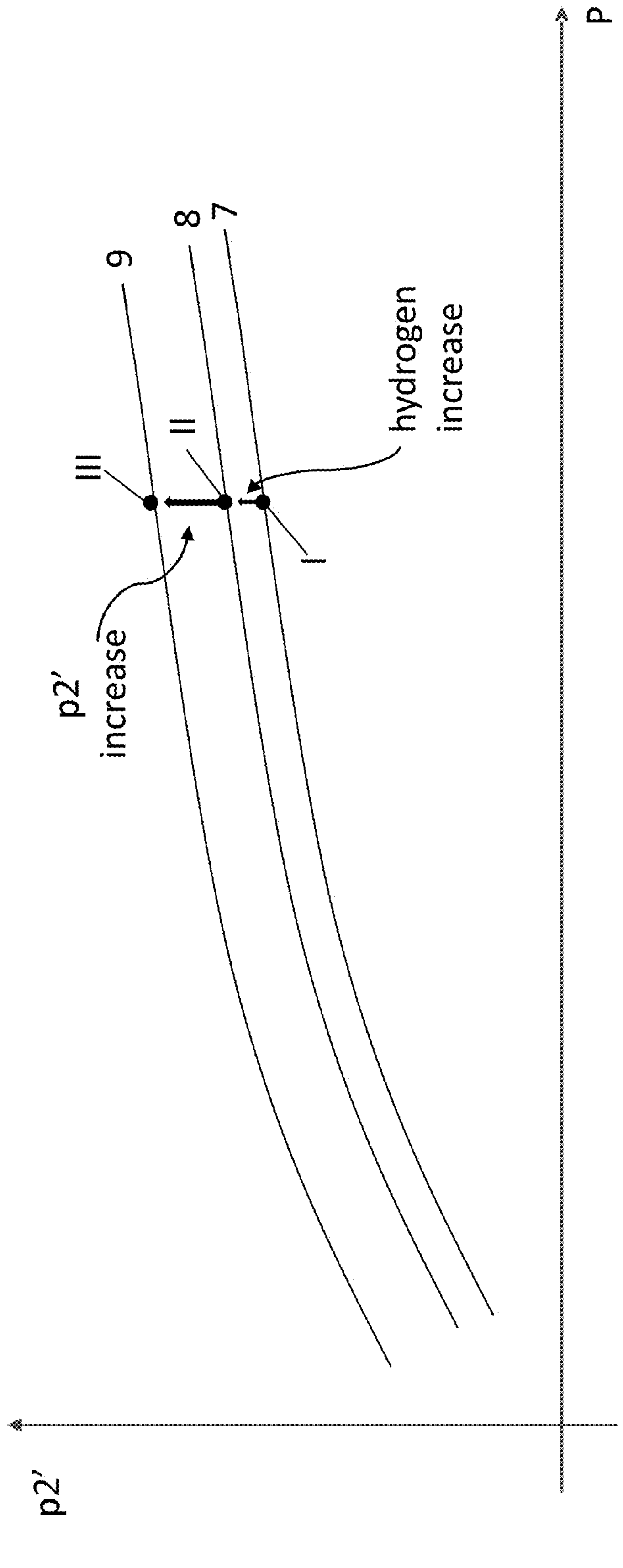
FIG. 3 is a diagram illustrating a method for operating an internal combustion engine during a change of a hydrogen content in the fuel mixture.

FIG. 3 illustrates a method for operating an internal combustion engine 1 during a change of a hydrogen content in the fuel mixture by a diagram.

The diagram shows therefore a connection between a boost pressure setpoint $p_2'$ (ordinate) and a power output (abscissa) of an internal combustion engine 1 for different air-fuel mixtures (indicated by the lines a, b and c).

Line 7 discloses an operation by an air-fuel mixture of charged air and natural gas, wherein the internal combustion engine 1 is operated at an operating point I to reach a required power output P.

If the fuel provided, e.g., by a public supply grid, changes to a fuel mixture comprising natural gas and a content of hydrogen (as shown by line 8), then the internal combustion engine 1 has to be transferred to operation point II to deliver continuous power output P.

As such, a variation of the hydrogen content in the fuel mixture of the air-fuel mixture appears, according to certain aspects of the invention, it is provided to control the ignition timing, wherein the higher the amount of hydrogen in the fuel mixture the later the ignition timing is set to compensate a shift of center of combustion due to higher flame speed of hydrogen compared to the first fuel, i.e., operation point I in this example.

Furthermore, as can be seen in FIG. 3, the boost pressure is increased during the increase of hydrogen, wherein the lambda value is changed. By this increase of the boost pressure $p_2'$, the control of the ignition timing to late and the increase of hydrogen content can be compensated to keep the power output constant and reach operation point II, line 8, indicating a specific lambda value for a specific hydrogen content of a fuel mixture.

Starting from the operating point II, the boost pressure $p_2'$ can be increased further, wherein line 9—indicating an air-fuel mixture with a different lambda value but the same fuel-mixture as line 8—can be reached.

As the boost pressure $p_2'$ of an air-fuel mixture starting in operation point II is increased, wherein the certain fuel mixture mass is kept constant, also the lambda value is increased until an operation point III is reached, wherein the NOx emissions can be reduced while still having the same power output P.

The different relationships between the boost pressure $p_2'$, the power output P, a lambda value, and a NOx content can be stored in the control unit 2, e.g., in the form of FIG. 3.

LIST OF USED REFERENCE SIGNS

1 internal combustion engine
2 control unit
3 combustion chamber
4 actuator
5 actuator
6 signal conductive connection
7 line
8 line
9 line
10 compressor bypass valve
11 compressor
12 turbine bypass valve
13 exhaust turbine
14 turbocharger
15 mixture cooler 15
16 ignition timing control module
17 boost pressure control module
18 calculation unit
19 hydrogen control unit

The invention claimed is:

1. A method for operating an internal combustion engine, wherein the internal combustion engine is operated by an air-fuel mixture comprising a fuel mixture and air, wherein the fuel mixture comprises a first fuel including natural gas, and hydrogen as a second fuel different from the first fuel, wherein the method comprises:

obtaining a hydrogen content of the fuel mixture, and controlling at least an ignition timing as a function of the hydrogen content of the fuel mixture independent of a target power output of the internal combustion engine, wherein the higher an amount of hydrogen in the fuel mixture the later the ignition timing is set for at least partially compensating a shift of a center of combustion due to a higher flame speed of hydrogen compared to the first fuel, wherein a boost pressure by a compressor is adapted in a feedback control as a function of a continuously measured NOx content of an exhaust gas of the internal combustion engine.

2. The method according to claim 1, wherein the higher the amount of hydrogen in the fuel mixture the higher a boost pressure target value is set to meet a target NOx amount in the exhaust gas of the internal combustion engine.

3. The method according to claim 1, wherein a lambda value of the air-fuel mixture supplied to the internal combustion engine is adapted during a change of the amount of hydrogen in the fuel mixture for at least partially compensating an increase of the boost pressure without changing an actual power output of the internal combustion engine.

4. The method according to claim 1, wherein a lambda value of the air-fuel mixture supplied to the internal combustion engine is increased during an increase of the amount of hydrogen in the fuel mixture beyond an increase of the lambda value when using only the first fuel.

5. The method according to claim 1, wherein depending on the amount of hydrogen in the fuel mixture a target NOx amount in the exhaust gas of the internal combustion engine is held constant or decreased.

6. The method according to claim 5, wherein the target NOx amount in the exhaust gas of the internal combustion engine is set below a target NOx amount compared to a corresponding target NOx amount when using only the first fuel.

7. The method according to claim 1, wherein an amount of the fuel mixture is adapted to compensate a difference in a heating value of the hydrogen compared to the first fuel including the natural gas.

8. The method according to claim 1, wherein a boost pressure target value is adapted depending on the amount of hydrogen in the fuel mixture.

9. The method according to claim 8, wherein the higher the hydrogen amount in the fuel mixture the higher the boost pressure target value is set.

10. The method according to claim 1, wherein the boost pressure or a boost pressure offset is adapted as a function of the amount of hydrogen in the fuel mixture.

11. The method according to claim 1, wherein the hydrogen content of the fuel mixture is determined by a hydrogen sensor.

12. The method according to claim 1, wherein the hydrogen content of the fuel mixture is estimated by an in-cylinder pressure sensor and/or an exhaust gas temperature sensor.

13. A system, comprising:

a controller configured to control operation of an internal combustion engine using an air-fuel mixture comprising a fuel mixture and air, wherein the controller is configured to:

obtain a hydrogen content of the fuel mixture comprising first and second fuels, wherein the first fuel comprises natural gas and the second fuel comprises hydrogen; and control at least an ignition timing as a function of the hydrogen content of the fuel mixture independent of a target power output of the internal combustion engine, wherein the higher an amount of hydrogen in the fuel mixture the later the ignition timing is set for at least partially compensating a shift of a center of combustion due to a higher flame speed of hydrogen compared to the first fuel, wherein a boost pressure by a compressor is adapted in a feedback control as a function of a continuously measured NOx content of an exhaust gas of the internal combustion engine.

14. The system of claim 13, comprising the internal combustion engine controlled by the controller.

15. The system of claim 13, wherein the controller is configured to control the boost pressure of an intake into the internal combustion engine based on the amount of hydrogen in the fuel mixture.

16. The system of claim 13, wherein the controller is configured to control a lambda value of the air-fuel mixture in response to changes in the amount of hydrogen in the fuel mixture.

17. A system, comprising:

an internal combustion engine; and a controller configured to control operation of the internal combustion engine using an air-fuel mixture comprising a fuel mixture and air, wherein the controller is configured to:

obtain a hydrogen content of the fuel mixture comprising first and second fuels, wherein the first fuel comprises natural gas and the second fuel comprises hydrogen; and control at least an ignition timing as a function of the hydrogen content of the fuel mixture independent of a target power output of the internal combustion engine, wherein the higher an amount of hydrogen in the fuel mixture the later the ignition timing is set for at least partially compensating a shift of a center of combustion due to a higher flame speed of hydrogen compared to the first fuel, wherein a boost pressure by a compressor is adapted in a feedback control as a function of a continuously measured NOx content of an exhaust gas of the internal combustion engine.

18. The system of claim 17, wherein the controller is configured to control the boost pressure of an intake into the internal combustion engine based on the amount of hydrogen in the fuel mixture.

19. The system of claim 17, wherein the controller is configured to control a lambda value of the air-fuel mixture in response to changes in the amount of hydrogen in the fuel mixture.

* * * * *